J. T. GERMAN.
HEADLIGHT STEERING MECHANISM.
APPLICATION FILED JAN. 26, 1916.
1,204,002.
Patented Nov. 7, 1916.
2 SHEETS—SHEET 1.
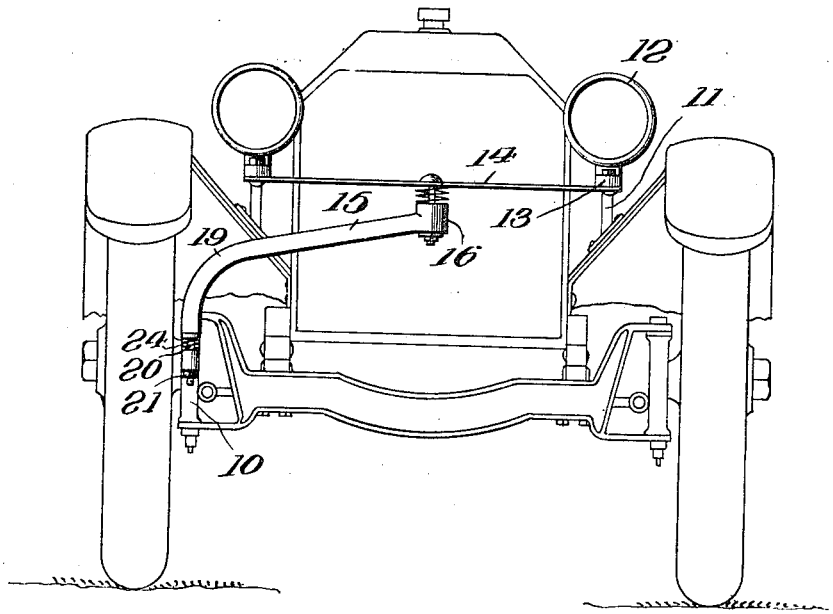
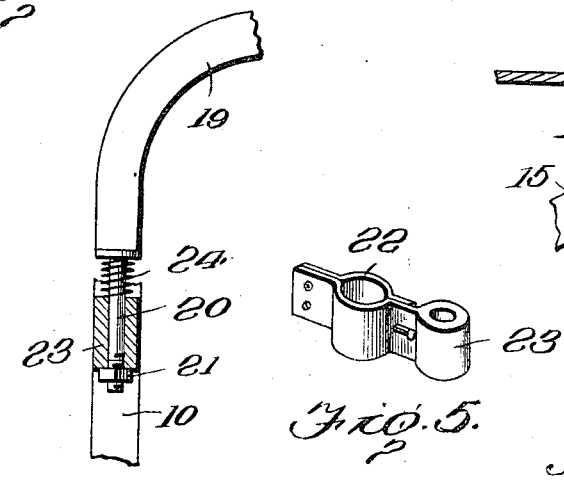
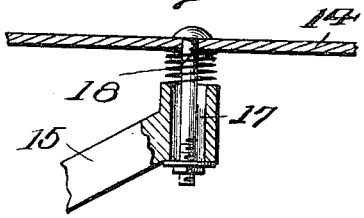
J. T. German, Inventor J. T. GERMAN.
HEADLIGHT STEERING MECHANISM.
APPLICATION FILED JAN. 26, 1916.
1,204,002.
Patented Nov. 7, 1916.
2 SHEETS—SHEET 2.
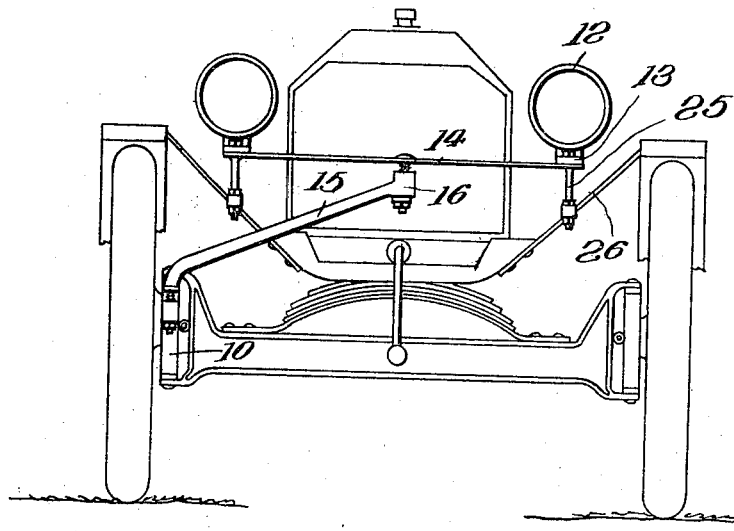
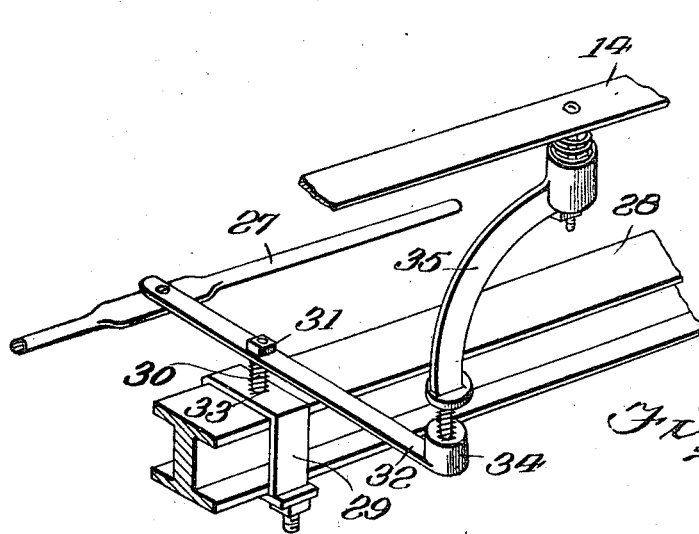
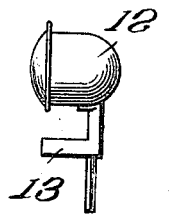
Inventor
J. T. German.
By
*illegible signature*, Attorneys

UNITED STATES PATENT OFFICE.

JOSEPH T. GERMAN, OF SLOAN, IOWA, ASSIGNOR OF ONE-FOURTH TO JOHN P. HOPPER, OF SLOAN, IOWA.

HEADLIGHT-STEERING MECHANISM.

1,204,002.  Specification of Letters Patent.  Patented Nov. 7, 1916.

Application filed January 26, 1916. Serial No. 74,371.

*To all whom it may concern:*

Be it known that I, JOSEPH T. GERMAN, a citizen of the United States, residing at Sloan, in the county of Woodbury and State of Iowa, have invented certain new and useful Improvements in Headlight-Steering Mechanism, of which the following is a specification.

This invention contemplates an improved headlight steering mechanism for motor vehicles and has as its primary object to provide a construction which may be readily attached to or employed with any conventional type of automobile and adapted to turn the headlights thereof to direct the rays from the said lights in the path of the vehicle as the vehicle is guided.

The invention has as a further object to provide a mechanism of this character constructed to compensate for the usual lateral play allowed the front wheels of the vehicle so that the headlights will be turned only as the vehicle is guided. And a still further object of the invention is to provide a mechanism of this character which may be attached either to one of the steering knuckles of the vehicle or to the rod operatively connecting the said knuckles and wherein compensating play will be permitted between such point of attachment of the mechanism and the headlights so that the mechanism will not bind when the body of the vehicle is caused to move upon its springs relative to the running gear thereof.

Other and incidental objects will appear as the description proceeds and in the drawings wherein I have illustrated the preferred embodiment of the invention and wherein similar reference characters designate corresponding parts throughout the several views, Figure 1 is a front elevation showing my improved mechanism applied to a conventional type of motor vehicle wherein the springs of the vehicle are arranged to project forwardly in front of the body thereof, Fig. 2 is a similar view showing my improved mechanism attached to a conventional type of motor vehicle wherein the springs at the forward end of the vehicle are arranged parallel to the vehicle body, Fig. 3 is a fragmentary sectional view of the connection between the rod operatively connecting the headlights and the drag rod which is attached to the vehicle steering mechanism, Fig. 4 is a fragmentary sectional view of the connection between the drag rod and the crank arm of my improved mechanism which is attached to the vehicle steering gear, Fig. 5 is a perspective view showing the crank arm detached, Fig. 6 is a side elevation showing one of the headlights detached, and Fig. 7 is a fragmentary perspective view showing a slightly modified form of the invention.

In order that the construction and mounting of my improved mechanism may be clearly brought out, I have, in Fig. 1 of the drawings, shown the invention in connection with a conventional type of motor vehicle including, as a part of the steering mechanism thereof, the ordinary form of steering knuckles 10. Conveniently located upon the body of the vehicle are lamp receiving posts 11 upon which are rotatably mounted the lamps or headlights 12. The headlights 12 may be connected to the posts 11 in any suitable manner but are preferably provided with trunnions, as more particularly shown in Fig. 6, freely fitting in the upper ends of the posts. Suitably connected to the lamps 12 or formed integral therewith, are laterally extending crank arms 13 which project forwardly therefrom. Pivotally connected to the outer extremities of the crank arms 13 to extend therebetween is a connecting rod or bar 14.

Associated with the bar 14, is a drag rod or member 15 which, at its outer extremity, is provided with an enlarged transversely arranged head 16. The head 16 is formed with a transversely elongated opening 17, as more particularly shown in Fig. 3 and a bolt or other suitable fastening device 18 which is passed through the bar 14 at a point substantially midway its ends, extends freely through the said opening to connect the rod 15 with the bar. Interposed between the head 16 and the arm 14 is a helical spring which surrounds the bolt 18 and is adapted to permit the head 16 to shift vertically relative to the said bar. Moreover, this spring will normally prevent any rattling between the parts. At its inner extremity, the rod 15 is provided with a laterally and downwardly curved terminal 19 which extends to a point in front of one of the steering knuckles 10 of the vehicle, as more particularly shown in Fig. 2. Formed on the terminal 19 is a reduced longitudinally extending pivot pin or bolt 20 screw threaded at its outer extremity to receive the nut 21.

Detachably connected to the adjacent knuckle 10 of the vehicle is a forwardly extending crank arm or attaching bracket 22 which may be constructed as shown in Fig. 5 to clamp around the knuckle or if preferred, may be made integral therewith, this arm providing an operating means or element for the drag rod. At its outer extremity, the crank arm 22 is provided with a bearing 23 freely receiving the pivot pin 20 of the rod 15 which pivot pin is connected to the said arm by the nut 21 as more particularly shown in Fig. 4. As shown in this figure, the pivot pin 20 is of a length to permit the adjacent extremity of the rod 15 to move vertically relative to the crank arm 22 and interposed between the adjacent terminal of the rod and the said crank arm, is a helical spring 24 which surrounds the pivot pin 20, this spring normally acting to take up the play between the members.

It will now be clear that when the front wheels are turned either to one side or the other to guide the vehicle, the crank arm 22 will be simultaneously swung therewith. The rod 15 will be correspondingly shifted and motion from the rod 15 will be communicated to the bar 14 and thence through the crank arms 13 of the lamps 12 to shift the lamps. Consequently, the lamps will be turned as the vehicle is guided, to direct the rays from the lamps in the path of the vehicle. The usual lateral play permitted in the front wheels of the vehicle will be taken up at the connection between the rod 15 and the bar 14 the pin 18 being adapted to slide within the slot or opening 17 formed in the head 16 of the rod 15 to permit the said rod to shift relative to the bar. It will also be observed that movement of the body of the vehicle relative to the running gear thereof will be taken up at the connection between the rod 15 and the crank arm 22, the pin 20 of the said rod being adapted to slide within the bearing 23 of the crank arm against the action of the spring 24 so that the rod 15 will not bind between the crank arm and the bar 14 when in practical use. It will therefore be seen that I provide a very simple and efficient construction for the purpose set forth and mechanism which may be readily attached to any conventional type of motor vehicle as now in common use or may be embodied in the construction of motor vehicles as originally manufactured.

In Fig. 2 of the drawings, I have shown my improved mechanism applied to a conventional type of motor vehicle wherein the springs at the front of the vehicle are parallel to the body thereof. In Fig. 1 of the drawings, it will be observed that the springs of the vehicle extend longitudinally in front of the vehicle body and for this reason, the rod 15 is provided with the relatively long curved terminal 19 so that the said rod will, under all conditions, clear the springs at the adjacent side of the vehicle. Since, in the type of vehicle shown in Fig. 2, the springs do not project forwardly of the body of the vehicle into the path of the rod 15, it becomes unnecessary to curve the rod at its inner extremity and accordingly, the said rod may be constructed as shown in this figure. The lamp receiving posts 25 are rotatably mounted upon the fender brackets 26 and the said posts are formed with crank arms 13 to which is pivotally connected the bar 14. The mechanism disclosed in Fig. 2 is otherwise identical with that illustrated in Fig. 1, the change in the rod 15 being made merely to adapt the rod to the type of vehicle disclosed, and in this connection, it will, of course, be understood that various other minor changes may be made in the structural details of the invention to adapt my improved mechanism to vehicles of different makes without in the slightest departing from the spirit of the present invention.

In Fig. 7 of the drawings, I have disclosed a slight modification of the invention whereby my improved mechanism may be operatively attached to the connecting rod of the vehicle steering mechanism since, in some instances, it may be found undesirable or inconvenient to attach the headlight steering mechanism to one of the steering knuckles of the vehicle. The connecting rod is conventionally illustrated at 27, this rod being arranged in the rear of the front axle 28 of the vehicle. Detachably connected to the vehicle axle, at some suitable point, is a clip 29, upon which is formed an upstanding pivot pin 30 screw threaded at its upper extremity to receive a nut 31. Mounted upon the pivot pin 30, is a rock arm or lever 32 between which and the clip 29 is interposed a helical spring 33 which surrounds the pivot pin and is adapted to cushion the rock arm 32 upon the vehicle axle. Moreover, by this arrangement, it will be observed that the said rock arm may be moved vertically relative to the vehicle axle to prevent any binding between the coacting elements of the mechanism. At its inner extremity, the rock arm 32 is pivotally connected to the rod 27 in any suitable manner and at its outer extremity is formed with a bearing 34 adapted to coöperate with a drag rod 35. This rod is substantially identical with the drag rod 15 shown in the preferred form of the invention and is connected to the bearing 34 and the bar 14 in a similar manner, the drag rod 35 simply being shortened to extend between the rock arm 32 and the said bar. It will be seen that the arm 32 provides an operating means or element for the drag rod and when the connecting rod 27 is shifted longitudinally to guide the vehicle, the rock arm 32 will pivot upon the pin 30 to consequently shift the drag rod 35 and actuate the bar 14 to turn the headlights. Accordingly, the headlights will be directed as the vehicle is guided.

In view of the preceding description, it will be seen that in any instance where it is desired to employ my improved mechanism in connection with a vehicle having the connecting rod of its steering mechanism disposed forwardly of the front axle of the vehicle, the drag bar 15 which I employ may be attached directly to the said connecting rod by a connection similar to that illustrated in Fig. 4 so that the use of any crank arms or rock arms between the drag bar and the steering mechanism of the vehicle will be eliminated.

Having thus described my invention, what I claim and desire to secure by Letters Patent is:

1. In headlight steering mechanism, rotatably mounted headlights, a bar operatively connecting the said headlights to extend transversely therebetween, a drag rod freely connected to said bar and provided with a pivot pin, operating means slidably receiving the said pin with the drag rod adapted to shift vertically relative to the said means, and yieldable means interposed between the said operating means and the rod for normally holding the rod against shifting movement, the said operating means being adapted for connection to an element of a vehicle steering gear whereby shifting of the said element to steer the vehicle will rotate the said headlights.

2. In headlight steering mechanism, rotatably mounted headlights, a bar operatively connecting said headlights to extend transversely therebetween, a drag rod freely connected to said bar, an operating element, and a pivot pin connecting the said rod to the said element with the rod disposed for vertical shifting movement relative to the said element, the said element being adapted for operative connection to an element of a vehicle steering gear whereby shifting of the said last mentioned element to steer the vehicle will rotate the said headlights.

3. In headlight steering mechanism, rotatably mounted headlights, a bar pivotally connecting said headlights to extend transversely therebetween, a drag rod, a pivot pin freely connecting the rod with the said bar, a shank carried by the rod, and an attaching bracket slidably receiving said shank with the rod adapted for vertical movement relative to the said bracket and with the bracket adapted for connecting to a steering knuckle of a vehicle steering gear whereby shifting of the said knuckle to steer the vehicle will rotate the said headlights.

4. In headlight steering mechanism, rotatably mounted headlights, a bar operatively connecting said headlights to extend transversely therebetween, a drag rod provided with a head having an elongated opening therethrough, a bolt extending freely through said opening to pivotally connect the rod with the said bar with the bolt adapted to shift laterally and vertically within the opening for permitting independent vertical and lateral shifting movement of the rod relative to the bar, and a spring surrounding the bolt and interposed between the bar and said head for normally holding the rod against vertical shifting movement, the rod being adapted for operative connection to an element of a vehicle steering gear whereby shifting of the said element to steer the vehicle will rotate the said headlights.

In testimony whereof I affix my signature.

JOSEPH T. GERMAN. [L. S.]

Copies of this patent may be obtained for five cents each, by addressing the "Commissioner of Patents, Washington, D. C."